Sept. 24, 1963 J. J. KASSIG 3,105,125

POWER SEPARATION FILTER

Filed Oct. 30, 1959

INVENTOR
J. J. KASSIG
BY *Charles Scott Phelan*
ATTORNEY

United States Patent Office 3,105,125 Patented Sept. 24, 1963

3,105,125
POWER SEPARATION FILTER

Julius J. Kassig, South Plainfield, N.J., assignor to Bell Telephone Laboratories, Incorporated, New York, N.Y., a corporation of New York Filed Oct. 30, 1959, Ser. No. 849,861
14 Claims. (Cl. 179—170)

This invention relates to a power separation filter for signal transmission systems, and more particularly the invention relates to improved means for reducing spurious coupling paths between the signal and power transmisson channels in repeaters of such a system.

In certain transmission systems, such as submarine cables for telephone systems, operating energy is supplied to a plurality of repeaters from the system terminals via the same conductors which are employed to supply signal energy to the repeaters. The operating energy is usually a direct current or an alternating current at a frequency which is much lower than the signal frequencies to be amplified in the repeaters. Accordingly, impedance means have been utilized to separate the signal frequency currents from the power frequency currents at each repeater in order that the signal and power energies may be applied to the proper portions of the repeater. Such signal separating impedance means also direct to the power energy portions of the repeaters the low frequency alternating current testing signals that are conventionally transmitted through the power portions of repeaters for fault location purposes when no signal frequencies are being transmitted in the repeater amplifier. It has been found, however, that frequencies in certain parts of the signal spectrum find spurious transmission paths to the repeater output via stray capacities and combine in the output with the signals which have been amplified by the repeater, thereby producing distortion in the gain-versus-frequency response characteristic of the repeater. In one system the frequencies causing the most spurious interference were in a band which included 120 kilocycles per second. The distortion may be relatively small at any one repeater but in systems which employ a large number of repeaters, such as a trans-oceanic cable system, the distortions may have a cumulative effect which is difficult to eliminate by conventional equalization techniques. If equalization were attempted, the networks required would be complex and would necessitate the addition of large numbers of bulky circuit elements to the cable. This would be undesirable since one design objective in submarine cable systems is to reduce the number of circuit elements in order to reduce the probability of system failure.

Impedance balancing techniques have been employed to reduce the effects of the aforementioned stray capacitances. However, such systems are not completely acceptable for submarine cable systems. The circuit balancing elements cannot be adjusted conveniently after cable laying operations have been completed to compensate for changes which may take place both during and after the laying operation. Such changes tend to degrade the balanced condition and thereby reduce the effectiveness of the repeater.

Accordingly, it is one object of the invention to reduce the extent of spurious transmission paths in inaccessible repeater systems.

Another object is to separate frequency components of electrical energy into separate transmission channels with a minimum of spurious coupling between such channels.

A further object is to reduce distortion in the gain-versus-frequency characteristic of a signal repeater due to spurious coupling between the signal and power transmission paths.

Yet another object is to avoid the use of sensitive impedance balances and complex filtering arrangements for separating and recombining the power and signal energy components at repeaters in cable transmission systems.

An additional object is to extend the useful signal frequency range of transmission system repeaters which employ power separation filters.

These and other objects of the invention are realized in an illustrative embodiment thereof in which a two-winding choke is connected in the signal input path of a repeater and a similar choke is connected in the signal output path of the repeater. Each choke has one winding thereof connected in series in each of the conductors of the signal path, and a metallic connection of low impedance at all signal and power frequencies is provided in association with each choke to couple one conductor of the signal path to one conductor of the power path at a point between the choke and the amplification unit of the repeater. The two windings of the choke are poled to cause a cancellation of the inductive effects of one another upon signal currents in the signal path while the winding in the one signal path conductor presents a high impedance to signal currents in the power path.

A better understanding of the features and objects of the invention may be obtained from a consideration of the following specification, including the appended claims, together with the attached drawing in which:

Figure 1:
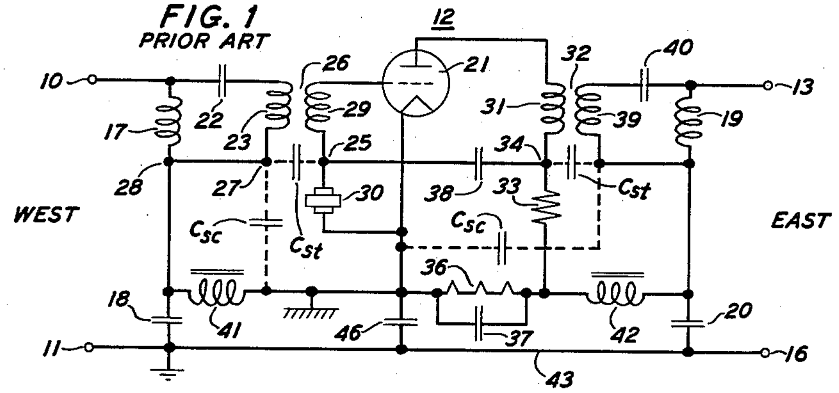
FIG. 1 PRIOR ART
FIG. 1 is a simplified schematic diagram of a repeater in a transmission system.

Referring to FIG. 1, a simplified repeater is shown to illustrate the effects of some of the stray capacities which can come into play in a repeatered cable system. Input terminals 10 and 11 represent the two conductors of a cable supplying a repeater which is generally designated 12, and the output of repeater 12 is applied to the two conductors of a further section of cable which are represented by the output terminals 13 and 16.

Electrical energy applied to the repeater 12 at terminals 10 and 11 includes signal currents ranging in frequency up to about one megacycle per second. Direct-current operating energy is also included as a component in the input energy. A coil 17 and a capacitor 18 are connected in series between the terminals 10 and 11 to constitute a power separation filter, or potential divider, for separating the signal and operating energies in a well-known manner. A similar coil 19 and capacitor 20 are connected in series between the output terminals 13 and 16. In order to simplify the illustration, circuit elements for only one direction of transmission, i.e., west to east, are shown; and the multi-stage amplifier of the repeater is schematically represented by the composite amplifier triode 21.

Considering first the signal frequency path in repeater 12, signal frequency potentials are developed primarily across the coil 17 and coupled by a blocking capacitor 22 to the primary winding 23 of an input transformer 26. A terminal 27, of winding 23, is directly connected to a terminal 28 which is common to coil 17 and capacitor 18. A secondary winding 29 of the transformer 26 is connected between the input control grid and the cathode of triode 21 via a piezoelectric crystal 30. Resonant devices such as crystal 30 are often included in inaccessible repeaters to inject an irregularity in the gain-versus-frequency characteristic of the repeater at a so-called signature frequency which lies outside of the regular signal frequency band. This signature frequency irregularity is employed to check the operating condition of the repeater.

The output circuit of triode 21 is connected between the anode and cathode thereof and includes a primary winding 31 of a coupling transformer 32, a feedback controlling impedance represented by resistor 33, and the total resistance of the series-connected heaters 36 of the various electron tubes in the amplifier of repeater 12. A by-pass capacitor 37 having essentially zero impedance at signal frequencies is connected in parallel with the heaters 36. As will be subsequently discussed in greater detail, the heaters 36 are connected in series in one conductor of the power transmission path, and the potential drop across the series combination of these heaters provides the anode-cathode potential necessary for the operation of the composite triode 21. A capacitor 38 is connected between a terminal 34 of primary winding 31 and a terminal 25 of secondary winding 29 to provide a gain-correcting negative feedback from the output circuit to the input circuit of composite triode 21. A secondary winding 39 of output transformer 32 is connected via a direct-current blocking capacitor 40 between the terminals of the coil 19.

Considering now the operating power path for repeater 12, direct current will flow between terminals 10 and 13 via coil 17, a first high impedance choke coil 41, the heaters 36, a second choke coil 42, and the coil 19. The direct-current circuit for the operating power is provided in a similar manner through subsequent sections of cable and through subsequent repeaters. The direct-current return path is provided by a conductor 43 extending between terminals 11 and 16. Conductor 43 may typically be exposed to the sea in a submarine cable system and is therefore equivalent to a sea ground. The cathode of triode 21 is designated chassis ground for the amplifier portion of repeater 12. An additional capacitor 46 is connected between the cathode of composite triode 21, and conductor 43.

It is apparent from FIG. 1 that the coils 17, 41, 42, and 19 comprise, together with capacitors 18, 46, and 20, a low pass filter which tends to pass the direct-current operating energy and tends to suppress the transmission therethrough of signal energy. Coil 17 and capacitor 18 separate the signal and operating currents into two channels which are essentially separate from one another. These two channels have a common connection at the power separation filters at the input and output of the repeater and they also include in common the chassis ground at the cathode of triode 21 and the heaters 36.

The stray capacities in the circuit of FIG. 1 provide spurious transmission paths for the signal. Stray capacities $C_{st}$ occur between the primary and secondary windings of coupling transformers 26 and 32, respectively. In addition, stray capacities $C_{sc}$ develop between primary winding 23 and chassis ground and between secondary winding 39 and chassis ground. The signal frequencies produce a potential difference across the stray capacities $C_{sc}$ and thus reach the output of repeater 12 via a variety of paths to combine with the output which is coupled to coil 19 from transformer 32.

The stray capacity $C_{st}$ permits signal frequency voltages which may be developed across choke coil 41 and capacity $C_{sc}$, for example, to be applied across crystal 30 and thereby affect the net input signal voltage applied between the control grid and cathode of composite triode 21. Furthermore, the stray capacity $C_{st}$ between windings 31 and 39 permits an additional spurious voltage to be fed back to the input of triode 21 via the feedback capacitor 38. Other stray capacities may also be effective in the repeater, but the capacities $C_{st}$ and $C_{sc}$ are typical of the principal stray capacities which cause significant distortion in the amplifier output and should therefore be suppressed. As hereinbefore mentioned, the effect of each of these stray capacities is relatively small compared to the output signal amplitude of the repeater, but in order to provide accurate transmission of signals through a plurality of such repeaters the effect of the stray capacities must be substantially reduced.

Figure 2:
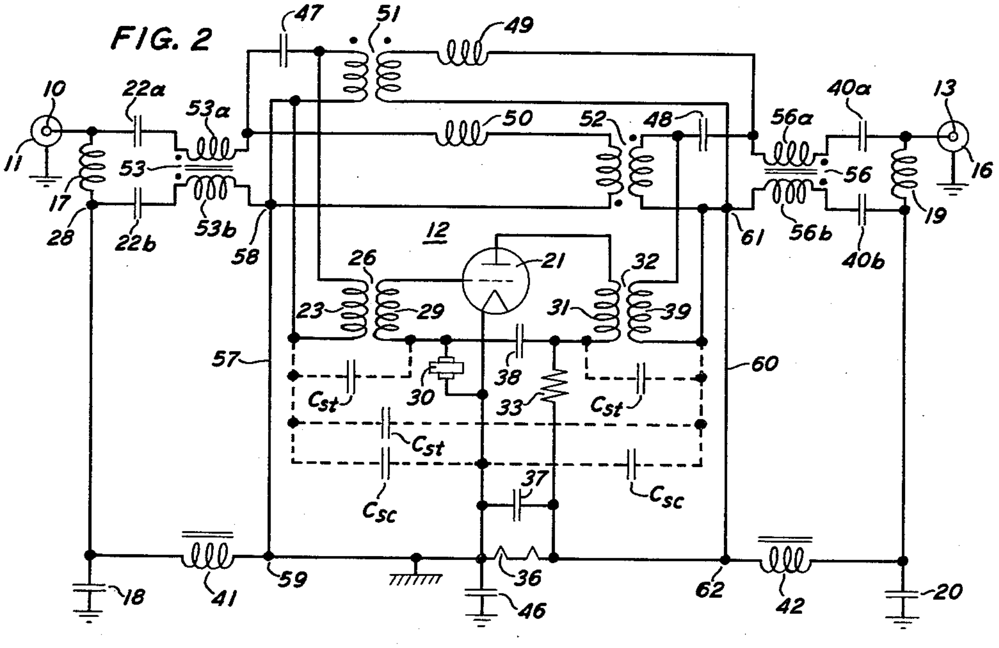
FIG. 2 is a simplified schematic diagram of a repeater in accordance with the present invention.

Referring to FIG. 2, the simplified repeater has been modified in accordance with the invention to reduce the effects of stray capacities, and circuit elements of FIG. 2 corresponding to those already shown in FIG. 1 are identified by the same reference characters. In addition, directional filtering networks have been added in FIG. 2 to illustrate the application of the invention to an equivalent four-wire repeater; but the circuit can be reduced to a one-way repeater employing the invention by simply taking out the directional filtering arrangement. The directional filters are schematically represented by the capacitors 47 and 48, representing high pass filters, and by the coils 49 and 50, representing low pass filters. Transformers 51 and 52 are employed to suppress the effect of one type of spurious feedback which arises as a result of the employment of the directional filters to utilize the single composite triode 21 for amplification of signals transmitted in the west-to-east direction and of the signals transmitted in the east-to-west direction in the well-known manner by employing high and low signal frequency bands for the two directions of transmission respectively. Of the two transformers 51 and 52, only transformer 52 accomplishes a phase inversion to accomplish the mentioned spurious feedback suppression. Signals to be transmitted in a west-to-east direction are modulated in the high frequency band and are applied from terminals 10 and 11 through the directional filter capacitor 47, transformer 26, triode 21, transformer 32, and capacitor 48 to the output terminals 13 and 16. Similarly, low frequency signals are transmitted in the east-to-west direction from terminals 13 and 16 via coil 49, transformer 51, transformer 26, triode 21, transformers 32 and 52, and coil 50 to the cable terminals 10 and 11. An additional stray capacity $C_{st}$ associated with transformers 51 and 52 is shown between the primary windings thereof. It was found that the use of an equivalent four-wire repeater with its directional filters adds spurious feedback paths which may be even more troublesome than the straight through spurious paths described in connection with FIG. 1.

In accordance with the present invention, however, the effects of some of the principal stray capacities, including the effects of the last-mentioned spurious feedback paths, are eliminated by adding to the signal transmission path of repeater 12 an input choke 53 and an output choke 56. Each of the chokes includes two windings, 53*a* and 53*b*, and 56*a* and 56*b*, respectively, upon the same core; and they are, therefore, sometimes called coaxial chokes. Each of the windings is connected in series with a different conductor in the signal path. The windings of each choke are poled with respect to one another so that the self inductance of each winding tends to offset the mutual inductance due to the coupling with the other winding with the result that each choke presents substantially zero inductance in the signal path.

Further to reduce the effects of stray capacities in accordance with the invention, a lead 57 is connected between a terminal 58 of winding 53*b* and a terminal 59 which is in series in the conductor of power transmission path which is at chassis ground. A similar lead 60 is connected between a terminal 61 of winding 56*b* and a terminal 62 which is also in series in the power transmission path. Terminals 58 and 61 are on the amplifier side of their respective windings. Terminal 62 is illustrated as being located between the heaters 36 and choke coil 42, but it may also be located on the other side of heaters 36 at chassis ground as is terminal 59. Capacitors 22*a* and 22*b* are connected in series with windings 53*a* and 53*b*, respectively, to prevent direct current from flowing therein, and capacitors 40*a* and 40*b* are connected in series with windings 56*a* and 56*b* for the same purpose.

Any signal frequency currents tending to flow between the signal path and the power path of the repeater via the lead 57 or the lead 60 must flow in loops which include only one coil of either of the chokes 53 and 56.

Thus the inductances of winding 53*b* and of winding 56*b* tend to suppress the flow of signal frequency currents into the power transmission path. These chokes 53 and 56, however, do not interfere with transmission in the signal path because of the manner in which their respective windings are coupled. The presence of the various transformers and blocking capacitors in the repeater prevents the transmission of direct current from the power path via lead 57 and lead 60 to other parts of the repeater.

Lead 57 now short-circuits the tray capacity $C_{sc}$ on the input side of the repeater; and lead 60, together with by-pass capacitor 37, effectively short-circuits the stray capacity $C_{sc}$ on the output side of the repeater, thereby eliminating the spurious coupling therethrough. Likewise lead 57 forces the net potential difference across the combination of stray capacity $C_{st}$ and crystal 30 to be zero, and no spurious voltages can be developed across crystal 30. In a similar manner the lead 60 prevents the coupling of spurious voltages via the stray capacity $C_{st}$ which is associated with transformer 32. Likewise, the combination of the leads 57 and 60 together with by-pass capacitor 37 effectively short-circuits the stray capacity $C_{st}$ which is associated with the coupling transformers 51 and 52. It will be seen then that each of the leads 57 and 60 comprises a short-circuit between the signal and power paths of repeater 12, but neither lead carries a significant current because of the association therewith of chokes 53 and 56 and capacitors 22*b* and 40*b*.

Since capacitor 37 presents essentially zero impedance to signal frequency currents, the presence of the heaters 36 between lead 60 and chassis ground causes only a negligible difference in the function of this lead as compared to the function of lead 57 which is connected directly to chassis ground. However, if desired, lead 60 may be connected directly to chassis ground instead of to terminal 62. Either arrangement produces entirely satisfactory operation.

Figure 3:
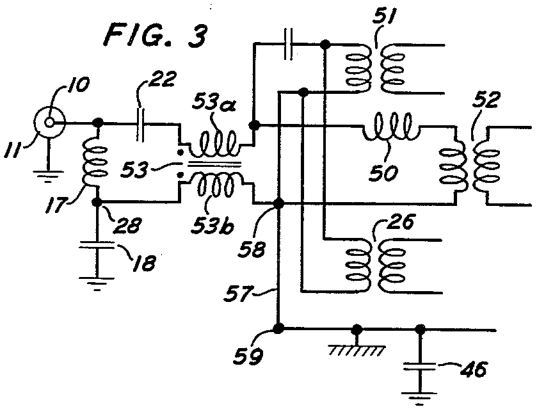
FIG. 3 is a portion of the diagram of FIG. 2 showing a modified form of the invention.

The circuit of FIG. 2 could be simplified somewhat by eliminating, i.e., open-circuiting, the chokes 41 and 42 therefrom and by short-circuiting the capacitors 22*b* and 40*b*. This type of arrangement is shown in FIG. 3 for the input of repeater 12. The modification of the output is similar. In this arrangement winding 53*b* is common to both the signal and the power paths and conducts both the signal frequency currents and the direct current for supplying operating power. The operation of the circuit is essentially the same as the operation already described since winding 53*b* presents a high impedance to signal frequency currents tending to flow in the power path but essentially zero impedance to signal frequency currents in the signal path. Winding 53*a* is still connected in the signal path only. Such an arrangement may, however, inject some complication into the problem of designing the chokes 53 and 56, since the direct current flowing in one winding of each of these chokes may tend to saturate the core thereof.

Although this invention has been described in connection with particular embodiments thereof, it is to be understood that additional embodiments which will be apparent to those skilled in the art are included within the spirit and scope of the appended claims.

What is claimed is:

1. In a repeatered signal transmission system, a transmission line, first and second transmission channels, filter means connected between said line and said channels for applying high frequency signals on said line to said first channel and direct-current signals on said line to said second channel, an amplifier, means coupling said amplifier in said first channel for amplifying said high frequency signals, a connection between said amplifier and said second channel for supplying operating potential to said amplifier from said second channel, a first inductor connected in said first channel and having a high impedance to said high frequency signals, a further connection from a terminal of said first inductor which is remote from said filter means to said second channel, said further connection having substantially zero impedance to both said high and said low frequencies, and a second inductor connected in said first channel for cancelling the inductive effect of said first inductor therein.

2. In a repeatered signal transmission system, a transmission line, first and second transmission channels, filter means coupling high frequency signals between said line and said first channel and coupling direct-current signals between said line and said second channel, an amplifier, means coupling said amplifier in said first channel for amplifying said high frequency signals, a connection between said amplifier and said second channel for supplying operating potential to said amplifier from said second channel, a first inductor connected in said first channel and having a high impedance to said high frequency signals, a short-circuit connection from a terminal of said first inductor which is remote from said filter means to said second channel, a second inductor connected in said first channel for cancelling the inductive effect of said first inductor therein, and means in said channels and including said inductors for attenuating to substantially zero amplitude any signals tending to flow in said short-circuit connection.

3. A power separation filter comprising a transmission line, first and second energy transmission channels, means coupled to said line for separating the energy thereon into high and low frequencies, said low frequencies including direct current, and applying said high and low frequencies to different ones of said channels, inductive means comprising two coils, means connecting a first one of said coils in series in both of said channels, means connecting a second one of said coils in series in only the one of said channels receiving said high frequencies, said coils being inductively coupled to one another and poled for the suppression of the inductive effect thereof in said one channel.

4. In a signal transmission system having two separate two-wire transmission channels supplied from a common source with electrical energy of different frequencies, first and second coils connected in series in separate wires of a first one of said channels, said coils being inductively coupled to one another in series opposing relation in said first channel to present substantially zero inductance to said first channel, and means connecting one only of said windings in series in one wire of a second one of said channels.

5. In a signal transmission system a two-conductor transmission line, an inductor, and a capacitor connected in series between the conductors of said line, a first two-conductor energy transmission channel having the input thereof connected across said inductor, a second two-conductor energy transmission channel connected at the input thereof across said capacitor, two coils connected respectively in series in the two conductors of said first channel, said coils being inductively coupled for opposing the inductive effects of one another in said first channel, and means further connecting one of said coils in series in a connection between one conductor of said other channel and a circuit point common to said conductor and said capacitor.

6. The transmission system in accordance with claim 5 which comprises in addition a separate capacitor connected in series with each of said coils, and a choke coil having a high impedance to currents of frequencies transmitted in said first channel connected in shunt with said one coil and its associated capacitor.

7. In a repeatered transmission system a two conductor transmission line, a repeater connected in said line for amplifying signal energy therein and comprising a two-conductor signal transmission channel and a two-conductor power transmission channel, frequency sensitive impedance means connecting the inputs and the outputs of said channels in said transmission line, an amplifier, means in the input and output of said amplifier for coupling said amplifier in said signal channel, metallic means connecting one conductor of said power channel to said amplifier for applying operating potential thereto, and means suppressing the effect of stray capacitance coupling between said channels comprising two inductive devices each having two windings, means connecting one of said devices in the input of said signal channel between said impedance means and said coupling means, means connecting the other of said devices in the output of said signal channel between said impedance means and said coupling means, each winding of each of said devices being connected in a different conductor of said signal channel and inductively coupled to the other winding of such device to suppress the inductive effect thereof in said signal channel, and means also connecting one winding of each of said devices between said frequency-sensitive impedance means and said one conductor of said power channel.

8. The repeatered transmission system in accordance with claim 7 in which said impedance means includes a terminal which is common to said signal and power channels, and said coupling means comprises first filter means directing a first band of signal frequencies through said signal channel, including said amplifier, in one direction, second filter means directing a second band of signal frequencies through said amplifier in said one direction but through the remainder of said signal channel in the opposite direction, and said second filter means has associated therewith two coupling transformers for coupling said second filter means to the input and output of said amplifier, respectively, one only of said coupling transformers being wound for inverting the phase of signals applied thereto.

9. In a signal transmission system, a two-conductor input transmission line, a first inductor and a first capacitor connected in series between the conductors of said line, a two-conductor signal transmission channel, means connecting the input of said signal transmission channel across said inductor and comprising a separate coil connected in series in each conductor thereof, said coils being inductively coupled to suppress the inductive effect thereof in said signal channel, and one of said coils in its series connection being connected to a terminal which is common to said inductor and said capacitor, a two-conductor output transmission line, a second inductor and a second capacitor connected in series between the conductors of said output transmission line, further connecting means similar to the last-mentioned connecting means for connecting the output of said signal transmission channel across said second inductor, an amplifier having an input electrode, an output electrode, and an electrode which is common to both the input and the output of said amplifier, a piezoelectric crystal, first transformer means coupling signals from the input of said signal channel between said input and common electrodes of said amplifier via said input coils and said crystal, second transformer means coupling signals between said output and common electrodes to the output of said signal channel via said output coils, a two-conductor power transmission channel, means connecting the input of said power transmission channel across said first capacitor and connecting the output of said power transmission channel across said second capacitor, the last-mentioned connecting means including means connecting said one input coil of said signal channel between one conductor of said power channel and said common terminal, and means connecting the corresponding one output coil of said signal channel between the same conductor of said power channel and a common terminal of said second conductor and capacitor, and a connection between said common amplifier electrode and said same conductor of said power channel for supplying operating potential to said amplifier.

10. A power separation filter comprising one two-conductor input circuit and two two-conductor output circuits, a frequency sensitive impedance means interconnecting said input circuit to both of said output circuits for coupling energy in a predetermined range of frequencies to a first one of said output circuits and direct-current energy to a second one of said output circuits, two coils, means connecting each of said coils in series in a different conductor of one of said output circuits, said coils being inductively coupled together for the suppression of longitudinal currents in the two wires of said one output circuit, and means connecting one of said coils between said impedance means and one conductor of the other of said output circuits.

11. The power separation filter in accordance with claim 10 in which a separate capacitor is connected in series with each of said coils between such coils and said impedance means, and a choke coil is connected in parallel with the series combination of said one coil and the capacitor connected thereto.

12. A signal transmission system comprising a two-conductor input transmission line, a two-conductor output transmission line, a first inductor and a first capacitor connected in series between the conductors of said input line, a second inductor and a second capacitor connected in series between the conductors of said output line, two two-conductor transmission channels for providing parallel transmission paths for signal energy in a predetermined range of frequencies and for direct-current energy, respectively, between said input and output lines, one of said channels having the input thereof connected across said first inductor and having the output thereof connected across said second inductor, the other of said channels having the input thereof connected across said first capacitor and having the output thereof connected across said second capacitor, each of said channels having one conductor thereof connected to a terminal which is common to said first inductor and said first capacitor and also having said one conductor thereof connected to a terminal which is common to said second inductor and said second capacitor, an amplifier connected to receive and amplify signals in said one channel and to receive operating potential from said other channel, a first coil connected in series in the other conductor of said one channel between said first inductor and the input to said amplifier, a second coil connected in series in said other conductor of said one channel between said second inductor and the output of said amplifier, a third coil inductively coupled to said first coil and connected in series in said one conductor of said one channel between said first inductor and the input of said amplifier, a fourth coil inductively coupled to said second coil and connected in series in said one conductor of said one channel between said amplifier output and said second inductor, connections between said one conductor of said other channel and the terminals of said third and fourth coils, respectively, which are remote from said common terminals, a separate capacitor connected in series with each of said four coils, and two choke coils connected in shunt, respectively, with said third and fourth coils and the respective capacitors connected in series therewith.

13. A power separation filter for a repeater which is supplied with operating energy over the same conductors which supply signals thereto for amplification, said filter comprising one two-conductor input circuit and two two-conductor output circuits, an inductor and a capacitor connected in series between the conductors of said input circuit, a first coil, means including said first coil connecting one conductor of each of said output circuits to a terminal which is common to said inductor and said capacitor, means connecting the second conductor of one of said output circuits to another terminal of said capacitor, and a second coil connecting the second conductor of the other output circuit to another terminal of said inductor, said coils being inductively coupled together with such polarity as to tend to suppress the inductive effects thereof in said one output circuit.

14. A filter for coupling electric signals on a transmission line to electric signal utilization means, said signals including an alternating current energy portion and a direct-current energy portion, said filter comprising two transmission paths for separately coupling said portions of said signals from said line to said utilization means, a direct connection between said paths, and inductive means connected in series in at least the one of said paths transmitting said alternating current portion and in series with said direct connection for suppressing the transmission of said alternating current portion in said connection.

References Cited in the file of this patent

UNITED STATES PATENTS

| | | |
|---|---|---|
| 1,673,023 | Rettenmeyer | June 12, 1928 |
| 1,865,165 | Bjornson | June 28, 1932 |
| 2,488,948 | Veazie | Nov. 22, 1949 |
| 2,768,351 | Scholten et al. | Oct. 23, 1956 |
| 2,776,408 | Tongue | Jan. 1, 1957 |